United States Patent [19]

Smith et al.

[11] Patent Number: 4,518,760
[45] Date of Patent: May 21, 1985

[54] PROCESS FOR PRODUCING POLY(DITHIOCARBAMATE) CHELATING RESINS

[75] Inventors: Maurice R. Smith, Cleveland; Harvey B. Cochran, Englewood, both of Tenn.

[73] Assignee: Olin Corporation, Cheshire, Conn.

[21] Appl. No.: 630,806

[22] Filed: Jul. 13, 1984

Related U.S. Application Data

[63] Continuation-in-part of Ser. No. 532,111, Sep. 14, 1983, abandoned, which is a continuation-in-part of Ser. No. 426,313, Sep. 29, 1982, abandoned.

[51] Int. Cl.$^3$ .............................................. C08G 18/38
[52] U.S. Cl. ......................................... 528/48; 528/68
[58] Field of Search ...................................... 528/48, 68

[56] References Cited

U.S. PATENT DOCUMENTS

| | | | |
|---|---|---|---|
| 3,039,865 | 6/1962 | Gilbert et al. | 75/81 |
| 3,213,006 | 10/1965 | Crain et al. | 204/99 |
| 3,536,597 | 10/1970 | Yamori et al. | 204/99 |
| 3,785,942 | 1/1974 | Carlson | 204/99 |
| 3,801,480 | 4/1974 | Krieg | 204/99 |
| 3,935,098 | 1/1976 | Oda et al. | 210/38 |
| 4,124,459 | 11/1978 | Blanch et al. | 204/99 |
| 4,151,077 | 4/1979 | Noqueira et al. | 210/21 |
| 4,160,730 | 7/1979 | Nguyen | 210/48 |

OTHER PUBLICATIONS

"Concentration of Heavy Metals by Complexation on Dithiocarbamate Resins", by Joseph F. Dingman, Jr., Kenneth M. Gloss, Ellen A. Milano and Sidney Siggia, in *Analytical Chemistry*, vol. 46, No. 6. pp. 774–777, May 1974.

"Selective Concentration and Determination of Trace Metals Using Poly(Dithiocarbamate) Chelating Ion--Exchange Resins", by Dennis S. Hackett and Sidney Siggia, in Environmental Analysis, Edited by Galen W. Ewing, Academic Press, Inc., New York, New York, 1977, pp. 253–265.

"Chelex 100 Chelating Ion Exchange Resin for Analysis, Removal or Recovery of Trace Metals", Bio-Rad Laboratories, Chemical Division, Product Information Sheet 2020, pp. 1–5, Mar. 1981.

*Primary Examiner*—Maurice J. Welsh
*Attorney, Agent, or Firm*—James B. Haglind; Donald F. Clements

[57] ABSTRACT

A novel process is provided for producing a poly(dithiocarbamate) resin chelating agent which comprises dissolving a polyimine in an alcohol solvent to form a polyimine solution. A polyisocyanate is admixed in the polyimine solution to produce a cross-linked polyamine-polyurea precursor resin. The cross-linked polyamine-polyurea precursor resin is then reacted with a mixture of $NH_4OH$ and $CS_2$ to produce a poly(dithiocarbamate) resin chelating agent.

The novel process can employ a polyimine in anhydrous or aqueous suspension form and uses non-hazardous solvents for the polyisocyanate reactant.

31 Claims, No Drawings

PROCESS FOR PRODUCING POLY(DITHIOCARBAMATE) CHELATING RESINS

BACKGROUND OF THE INVENTION

This application is a continuation-in-part of U.S. Ser. No. 532,111 filed Sept. 14, 1983 as a continuation-in-part of U.S. Ser. No. 426,313, filed Sept. 29, 1982, both now abandoned.

This invention relates to poly(dithiocarbamate) resins used to selectively remove heavy metal and other ions from aqueous solutions and to a method for preparing such resins.

One group of chelating agents showing unusual promise are the poly(dithiocarbamate) resins as reported by Hackett and Siggia of "Selective Concentration and Determination of Trace Metals Using Poly(dithiocarbamate) Chelating Ion-Exchange Resins" in *Environmental Analysis*, edited by G. W. Ewing, Academic Press, Inc., New York, N.Y., 1977, pages 253–265. These resins were found to sequester a large number of heavy metals.

Their procedure for making these resins comprised reacting, in dioxane solution, an 8:1 mixture of an anhydrous polyethyleneimine-1800 molecular weight and a polymethylene polyphenylisocyanate to form a solid polyamine-polyurea cross-linked precursor. This, in turn, was reacted with a mixture of $NH_4OH$ and $CS_2$ n isopropyl alcohol over a period of about 4 weeks to form resins having a sulfur content of about 16 percent and an equivalent $Cu^{+2}$ capacity (milliequivalents of Cu absorbed/gram of dry resin from an aqueous solution at a pH of about 4.8) of between about 0.5 and 1.35.

If followed rigorously, the above procedure for making such resins possesses a number of serious disadvantages, in terms of producing the large quantities needed for use in industrial applications. For example, the 4–5 week total reaction time imposes significant costs on the production cycle. However, more recent work by Miyazaki and Barnes ["Complexation of Some Transition Metals, Rare Earth Elements, and Thorium with a Poly(dithiocarbamate) Chelating Resin" in *Analytical Chemistry*, Vol. 53, No. 2, Feb. 1981, pages 299–304], has shown that the $NH_4OH/CS_2$ reaction time can be reduced to as short as 8–16 hours with essentially equivalent results. In addition, Hackett in Dissert. Abstr. Int. B37, 4430 (1977) teaches that both lower molecular weight polyimines and a variety of polyisocyanates can be used.

The common elements in these prior art studies are the use of dioxane as the solvent and an anhydrous polyimine used as a precursor reactant. Dioxane is a federally listed health hazard and it would be highly desirable if less hazardous solvents could be used. It is known that polyethyleneimines can be supplied as aqueous suspensions at attractive prices. However, they are, at best, only sparingly soluble in dioxane and attempts to form a satisfactory precursor resin from such a material almost invariably end in failure. The reason for this appears to be that the water in the suspension saturates the dioxane thus effectively inhibiting its ability to dissolve the polyimine so that very little, if any, is available to react with the polyisocyanate.

OBJECTS OF THE INVENTION

It is an object of the present invention to provide an improved process for producing a poly(dithiocarbamate) chelating resin.

It is an additional object of the present invention to provide an improved poly(dithiocarbamate) chelating resin which when admixed with chemical process and waste water streams selectively removes heavy metal and other pollutants.

It is a further object of the present invention to provide an improved process for producing a poly(dithiocarbamate) chelating resin in which non-hazardous solvents are employed.

Another object of the present invention is to provide an improved process for producing a poly(dithiocarbamate) chelating resin which can employ aqueous suspensions of polyimines as reactants.

These and other objects of the subject invention will become apparent from the following description and the appended claims.

BRIEF STATEMENT OF THE INVENTION

A process for producing a poly(dithio-carbamate) resin chelating agent comprises dissolving a polyimine in an alcohol solvent to form a polyimine solution. A polyisocyanate is admixed in the polyimine solution to produce a cross-linked polyamine-polyurea precursor resin. The cross-linked polyamine-polyurea precursor resin is then reacted with a mixture of $NH_4OH$ and $CS_2$ to produce the poly(dithiocarbamate) resin chelating agent.

DETAILED DESCRIPTION OF THE INVENTION

The novel process of the present invention for producing these resins proceeds in two stages. In the first stage, a polyimine such as polyethyleneimine is reacted with an aromatic or aliphatic polyisocyanate to produce a cross-linked polyamine-polyurea precursor resin. The precursor resin is, in the second stage, reacted with a mixture of $NH_4OH$ and $CS_2$ to produce the poly(dithiocarbamate) resin.

Polyimines useful for producing the poly(dithiocarbamate) resins include polymers of alkeneimine compounds having an average molecular weight ranging from about 1,000 to about 100,000, preferably from about 1,500 to about 80,000, and having the general formula:

$$-CHRCH_2NH-_x$$

where R is H or an alkyl group having from 1 to about 4 carbon atoms; and x is a positive number large enough to provide the desired molecular weight for the polyimine. Suitable polyimines include polymers of ethyleneimine, 2-methylethylenemine, 2-ethylethyleneimine, 2, 2-dimethylethyleneimine, 2-propylethyleneimine, 2-isopropylethyleneimine, 2-butylethyleneimine, and 2-isobutylethyleneimine. Preferred as polyimines are polymers of ethyleneimine, 2-methlethyleneimine, and 2-ethylethyleneimine, with polymers of ethyleneimine being most preferred. The polyimine employed as a starting material may be in any available form such as an anhydrous solid, a solution or an aqueous suspension. The polyimine is preferably added to the reaction mixture as a solution where the solvent is an aliphatic alcohol having from 1 to about 6 carbon atoms including methanol, ethanol, propanol, isopropanol, butanol, isobutanol, sec-butanol, tert-butanol and pentanol, cyclohexanol or mixtures thereof, or benzyl alcohol. Preferred as the alcohol solvent are aliphatic alcohols having from 1 to about 3 carbon atoms with isopropyl alcohol being more preferred.

Suitable polyisocyanates include aromatic polyisocyanates such as toluene diisocyanate, for example, the 2,4 and 2,6-isomers and mixtures thereof; methylene diphenylisocyanate having the formula

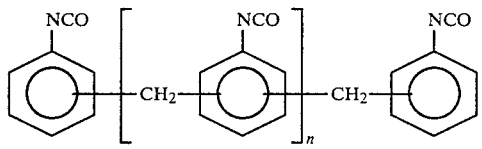

where n=0, 1, 2, 3, and mixtures thereof; and aliphatic diisocyanates such as hexamethylene diisocyanate having the formula:

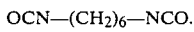

OCN—(CH$_2$)$_6$—NCO.

The polyisocyanate may be added to the reaction mixture directly or in solution form. In a preferred embodiment, the polyisocyanate is added as a solution in an aliphatic ether having from 1 to about 6 carbon atoms in each chain. Suitable ether solvents include dimethyl ether, diethyl ether, di-n-propyl ether, diisopropyl ether, dibutyl ethers (including iso-, sec- or tertiary butyl), amyl ethers (including iso-, sec- or tertiary amyl) and n-hexylether; with diethyl ether being a more preferred solvent.

The reaction of these materials to form a precursor resin in an alcohol solvent is unexpected. It is known that isocyanates will react with alcohols such as methanol to form urethanes as follows:

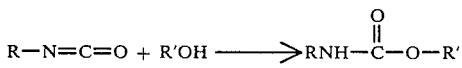

$$R-N=C=O + R'OH \longrightarrow RNH-\overset{\overset{\displaystyle O}{\|}}{C}-O-R'$$

Further, water reacts with isocyanates to form, first, carbamic acid which is unstable and breaks down to form $CO_2$ and an amine. It is postulated that the rapid reaction of the imine with the isocyanate prevents these secondary reactions from occurring to any great degree.

The precursor resin produced by the reaction of the polyimine and polyisocyanate will be a function of the starting materials used and the ratio of the reactants. Satisfactory precursor resins are produced using any suitable proportion of the polyisocyanate and the polyimine. For example, poly(dithiocarbamate) chelating resins which remove heavy metals and other pollutants from effluents can be produced using polyimine/polyisocyanate weight ratios of from about 1:1 to about 20:1. Preferred are chelating resins having lower sulfur contents which can be produced employing polyimine/polyisocyanate weight ratios of from about 1:1 to about 8:1. More preferred are poly(dithiocarbamate) chelating resins having a sulfur content of from about 6 to about 7% dry weight which are obtained at polyimine/polyisocyanate weight ratios of from about 1.5:1 to about 3.0:1. Where methylene diphenyl isocyanate (MDI) is employed as the polyisocyanate reactant, a mixture of methylene diphenyl isocyanates where n is 0, 1 and 2 is preferred, and more preferably a mixture where n is 0 and 1. This provides an isocyanate functionality in the range of 2.0 to about 3.5, and more preferably in the range of 2.0 to about 2.3.

The first stage reaction is quite rapid, even at room temperature, appearing to be complete in as little as 1 minute. However, a reaction time of up to 30 minutes and preferably from about 10 to about 30 minutes, is preferred to assure completion of the reaction which produces a cross-linked polyamine-polyurea precursor resin. The precursor resin reaction mixture may be used directly in the second stage of the process. Preferably the precursor resin is separated from the solvents, for example by filtration or centrifugation and washed with, for example deionized water or alcohol.

The poly(dithiocarbamate) resin products produced by the novel process of this invention are prepared by suspending the precursor resin in an aliphatic alcohol of the type used as the polyimine solvent, for example, isopropanol. The suspension is then admixed with a mixture of $NH_4OH$ and $CS_2$. The ammonium hydroxide solution employed can be any solution which does not significantly dilute the reaction mixture. For example, suitable $NH_4OH$ solutions are those containing at least about 10% $NH_3$ by weight. Preferably concentrated $NH_4OH$ solutions are employed containing from about 25 to about 35 percent by weight of $NH_3$. The amount of $CS_2$ present in the mixture is at least a stoichiometric amount which is an amount equivalent to that required to react with amine groups on the precursor resin which are available for addition. Preferably an excess of $CS_2$ is employed. The volume ratio of concentrated ammonium hydroxide to carbon disulfide is generally in the range from about 1:1 to about 1:4 and preferably from about 1:2.5 to about 1:3.5. The resin is digested therein for a period of between about 8 and about 20 hours. This produces a flaked chelating resin which after a final washing to remove the unused reactants and alcohol, is immediately usable.

Using the polyimine/polyisocyanate weight ratios defined above, a preferred embodiment of the poly(dithiocarbamate) resin is that produced by the reaction of polyethyleneimine with methylene diphenyl isocyanate having a functionality in the range of 2.0 to about 3.5. The chelating resin produced has a sulfur content of between about 6 and about 7 percent and an equivalent $Cu^{+2}$ capacity of between about 1.5 and about 2.5.

The exact formula of the finished resin is unknown. However, without wishing to be bound thereby, it is postulated that it is of the general formula:

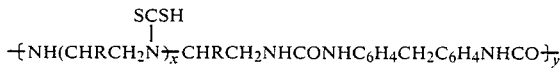

$$-(NH(CHRCH_2N)_{\overline{x}}CHRCH_2NHCONHC_6H_4CH_2C_6H_4NHCO)_{\overline{y}}$$
with SCSH substituent where x and y are functions of the particular imine and isocyanate compounds used.

The lower sulfur value of the preferred resins produced by the novel process of the present invention, as compared to that described by Hackett and Siggia, does not seem to negatively affect the overall capabilities of the finished resin. For example, the resin will remove at a pH of about 7 and with initial contaminant concentrations of about 0.5 ppm, 98+ percent of 10 of the 13 elements defined as "priority" pollutants under Section 307 of the Federal Clean Water Act from aqueous solutions. Of the remaining 3, about 90 percent of the silver, 66 percent of the arsenic and 12 percent of the antimony are removed in a single pass.

It has also been found that the resin can sequester a number of other pollutants as well. Thus, at a pH of about 7, it will remove 98+ percent of dissolved iron, titanium, cobalt, molybdenum, silicon and vanadium, and substantial amounts of any manganese and phosphorous present. These results are obtainable with these contaminants being present either alone or in combination with others.

The resin is usable over a wide range of operating conditions and solution concentrations. Thus, for example, in the chlor-alkali industry, it can be used with anolyte brines having between about 150 and about 300 grams per liter (g/l) NaCl, at temperatures up to about 100° C. and at pH values ranging from about 1 to about 12 without noticeable degradation. Further, when used with anolyte brines as produced in modern mercury cathode or membrane chlor-alkali cells, it is unaffected by the levels of chlorate or sulfate typically found therein. Further, in such an environment, it shows no signs of swelling or other significant physical degradation as a result of long-term exposure.

The resin of this invention may be utilized in various conventional methods of absorption. These include simple stirred contact for batchwise operation; packed tower or layer systems; or continuous operation either in fixed bed or in fluidized bed systems. In fixed bed operation, it is immaterial whether up-flow or down-flow is used. For continuous flow operation, the space velocity (ml/min./cm$^3$ of resin) should be between about 2 and about 30, with about 5 to about 10 being preferred. Absorption efficiency can be improved even further by series operation of two or even three absorption stations.

To suit particular needs, the resin can be prepared in several forms, for example, in the shape of beads, granules, or powder. Further, various means can be utilized to enlarge the specific surface area (m$^2$/g) of the resin so as to enhance its chelating capacity. One such means is the use of a carrier material which holds the resin either in an impregnated state or as a covering on its surfaces. For this, many types of carriers may be used but porous materials having specific surface areas of at least and preferably larger than 1 m$^2$/g are preferred. Such readily available materials include diatomaceous earth, pumice stone, zeolite, ground coke, activated charcoal, graphite, bentonite and open cell foamed urethane resins. For maximum absorption effectiveness, the carrier particle size should be between about 0.05 to about 2.0 mm in diameter.

Poly(dithiocarbamate) resins as prepared by the process described are not usually regenerated and, once fully saturated, are preferably discarded. Since present-day costs for the raw materials used to prepare the resin are relatively low and sequestration bonds quite strong, it is possible to safely and economically dispose of the resin in unsecured landfills or EPA certified landfills. In service, with brine from a modern mercury cell having a nominal mercury content of between about 0.1 and about 110 ppm, a column charge of about 55 gallons of resin for a brine flow rate of about 6 to about 10 gal./min. could be expected to last anywhere between about 30 and about 50 days.

The efficacy of the procedure for treating heavy metal contaminated solutions is shown in the following examples. All parts and percentages are by weight unless specified otherwise.

EXAMPLE 1

Resin Preparation

The poly(dithiocarbamate) resin used for the examples of the present invention was prepared by slowly adding, at room temperature, about 4.0 g of a polymethylene polyphenylisocyanate (supplied by Aldrich Chem. Co.), having a functionality of about 2.1, dissolved in about 10 ml of an aliphatic ether to a stirred solution comprised of about 7.0 g of a 50 percent aqueous suspension of polyethyleneimine (BASF Wyandotte Polymin P), dissolved in about 30 ml of isopropyl alcohol. This produced a precipitate of a polyamine-polyurea precursor resin which, after standing for about 30 minutes, was separated from the reaction solution by filtration. The product was then washed twice with 50 ml of isopropyl alcohol and once with 100 ml of deionized distilled water.

The washed precursor resin was then suspended in about 50 ml of isopropyl alcohol and mixed with 10 ml of concentrated NH$_4$OH and 30 ml of CS$_2$. After an initial stirring, the mixture was allowed to stand for about 16 hours after which, the reaction product was recovered by filtration. This was washed twice with 50 ml of isopropyl alcohol, twice with 100 ml of deionized distilled water, and, again with 50 ml of distilled water and dried. About 6.6 g of finished dried resin having a sulfur content of 6–7 percent was produced. The average equivalent Cu$^{+2}$ capacity was about 2.19, which is almost twice the value reported in prior art studies.

EXAMPLE 2

A 0.8 cm diameter column was charged with about 1.69 cc of resin of EXAMPLE 1 to a height of about 3.5 cm. A dechlorinated membrane cell brine at a pH of about 7.0 and a temperature of about 80° C. having a composition of about 300 g/l NaCl, 8 g/l Na$_2$SO$_4$, small amounts of NaOCl and NaClO$_3$, with about 5.11 ppm of Hg$^{+2}$ added thereto, was passed through the column at a flow rate of about 10 ml/min. for a space velocity value of about 6. The effluent brine on analysis had a mercury content of about 0.044 ppm for a 99+ percent removal. About 1500 ml of solution, having a total of about 7665 micrograms of Hg$^{+2}$, was passed through the column.

At the conclusion of the run, the bed was eluted with 100 ml of 1 M HCl, which extracted about 52 μg of Hg. The bed was then treated with 100 ml of 3 M HCl which extracted an additional 625 μg of Hg. Finally, the bed was treated with 100 ml of 12 M HCl which, while further extracting about 1560 μg of Hg, caused at least a partial decomposition of the resin, as shown by a pronounced odor of CS$_2$ above the bed.

EXAMPLE 3

About 1 liter of a synthetic waste water solution containing about 0.5 ppm of 19 inorganic pollutants and 0.2 ppm Hg at a pH of 7.0 was prepared. This was passed, at ambient temperature, through a column of resin as described in Example 2. The results obtained are given in Table I below:

TABLE I

|  | Concentration (ppm) | % Removal |
| --- | --- | --- |
| Ti | 0.50 | 99.80 |
| As** | 0.50 | 65.9 |
| P | 0.50 | 76.0 |
| Cu** | 0.50 | 100 |

TABLE I-continued

| | Concentration (ppm) | % Removal |
|---|---|---|
| Co | 0.50 | 98.0 |
| Ni** | 0.50 | 100 |
| Pb** | 0.50 | 98.2 |
| Mo | 0.50 | 99.6 |
| Cr** | 0.50 | 98.6 |
| Al | 0.50 | 99.6 |
| V | 0.50 | 99.6 |
| Be** | 0.50 | 98.2 |
| Tl** | 0.50 | 98.6 |
| Ag** | 0.50 | 92.4 |
| Cd** | 0.50 | 100 |
| Se** | 0.50 | 100 |
| Sb** | 0.50 | 12.4 |
| Zn** | 0.50 | 100 |
| Fe | 0.50 | 100 |
| Hg** | 0.20 | 100 |

**EPA Priority Pollutants

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A process for producing a poly(dithiocarbamate) resin chelating agent comprising:
   (a) dissolving a polyimine in an alcohol solvent to form a polyimine solution.
   (b) admixing a polyisocyanate in said polyimine solution to produce a cross-linked polyamine-polyurea precursor resin, and
   (c) reacting said cross-linked polyamine-polyurea precursor resin with a mixture of $NH_4OH$ and $CS_2$ to produce said poly(dithiocarbamate) resin chelating agent.

2. The process of claim 1 in which said polyimine comprises a polymer of an alkeneimine having the general formula $$-CHRCH_2NH-_x$$

where R is H or an alkyl group having from 1 to about 4 carbon atoms, said polyimine having an average molecular weight of from about 1000 to about 100,000.

3. The process of claim 2 in which said polyisocyanate is selected from the group consisting of aromatic polyisocyanates and aliphatic diisocyanates.

4. The process of claim 3 in which said alcohol solvent is selected from the group consisting of aliphatic alcohols having from 1 to about 6 carbon atoms and benzyl alcohol.

5. The process of claim 4 in which said mixture of $NH_4OH$ and $CS_2$ has a volume ratio of $NH_4OH$ to $CS_2$ in the range of from about 1:1 to about 1:4.

6. The process of claim 5 in which said polyimine and said polyisocyanate are reacted for a period of from about 1 to about 30 minutes.

7. The process of claim 6 in which said polyisocyanate is admixed as a solution in an aliphatic ether having from 1 to about 6 carbon atoms in each chain.

8. The process of claim 7 in which said polyisocyanate is an aromatic polyisocyanate.

9. The process of claim 8 in which said alcohol solvent is an aliphatic alcohol.

10. The process of claim 9 in which said alkeneimine is selected from the group consisting of ethyleneimine, 2-methylethyleneimine, and 2-ethylethyleneimine.

11. The process of claim 10 in which said polyisocyanate is methylene diphenylisocyanate having the formula where n=0, 1, 2, 3, and mixtures thereof.

12. The process of claim 11 in which said polyimine is an aqueous suspension.

13. The process of claim 12 in which said polyimine is present in an amount of from about 1.5 to about 3.0 parts by weight of said polyisocyanate.

14. The process of claim 13 in which said allphatic ether is diethyl ether.

15. The process of claim 14 in which said polyimine has a molecular weight of from about 1,500 to about 80,000.

16. The process of claim 15 in which said aliphatic alcohol is isopropyl alcohol.

17. The process of claim 16 in which said polyimine is polyethyleneimine.

18. The process of claim 17 in which the amount of $CS_2$ present in said mixture of $NH_4OH$ and $CS_2$ is at least a stoichiometric amount equivalent to the amine groups present on the precursor resin available for substitution.

19. A process for producing a poly(dithiocarbamate) resin chelating agent comprising
   (a) dissolving a polyimine in an aliphatic alcohol solvent to form a polyimine solution,
   (b) admixing an aromatic polyisocyanate in said polyimine solution to produce a cross-linked polyamine-polyurea precursor resin in a reaction mixture,
   (c) separating said cross-linked polyamine polyurea precursor resin from said reaction mixture, and
   (d) reacting said cross-linked polyamine-polyurea precursor resin with a mixture of $NH_4OH$ and $CS_2$ to produce said poly(dithiocarbamate) resin chelating agent.

20. The process of claim 19 in which said polyimine is a polymer of an alkeneimine compound having the formula:

$$-CHRCH_2NH-_x$$

where R is H or an alkyl group having from 1 to about 4 carbon atoms, said polyimine having an average molecular weight in the range of from about 1000 to about 100,000.

21. The process of claim 20 in which said aliphatic alcohol contains from 1 to about 3 carbon atoms.

22. The process of claim 21 in which said aromatic polyisocyanate is admixed as a solution comprised of an aliphatic ether solvent having from 1 to about 6 carbon atoms in each chain.

23. The process of claim 22 in which said aromatic polyisocyanate is toluene diisocyanate.

24. The process of claim 22 in which said aromatic polyisocyanate is methylene diphenylisocyanate having the formula

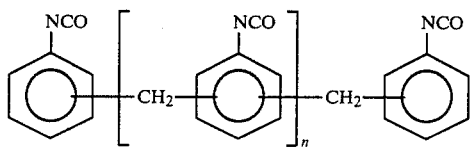

where n=0, 1, 2 and mixtures thereof.

25. The process of claim 24 in which, following separation, said cross-linked polyamine-polyurea precursor resin is suspended in an aliphatic alcohol solvent.

26. The process of claim 25 in which said mixture of concentrated $NH_4OH$ and $CS_2$ has a volume ratio in the range from about 1:2.5 to about 1:3.5.

27. A poly(dithiocarbamate) resin chelating agent by the process which comprises:
(a) preparing a precursor resin by
  (1) dissolving an aqueous suspension of a polyethyleneimine in an aliphatic alcohol solvent,
  (2) dissolving a polymethylene polyphenylisocyanate in an aliphatic ether solvent,
  (3) admixing said solutions to produce a cross-linked polyamine-polyurea precursor resin,
(b) separating said precursor resin from said solvents in the reaction mixture, and
(c) suspending said precursor resin in an aliphatic alcohol and reacting it with at least a stoichiometric amount of a mixture of concentrated $NH_4OH$ and $CS_2$, said resin having a sulfur content of between about 6 and about 7 percent and an equivalent $Cu^{+2}$ capacity of between about 1.5 and about 2.5.

28. The process of claim 27 wherein said polyimine has a molecular weight of from about 1,500 to about 80,000.

29. The process of claim 28 wherein said aqueous polyimine suspension contains between about 40 and about 60 percent by weight of polyethyleneimine.

30. The process of claim 29 wherein said alcohol solvent is isopropyl alcohol.

31. The process of claim 30 wherein said isocyanate functionality is between about 2.0 and about 2.3.

* * * * *